US012756884B2

(12) United States Patent
Bradford et al.

(10) Patent No.: US 12,756,884 B2
(45) Date of Patent: Oct. 6, 2026

(54) PROVIDING AUGMENTED REALITY IN ASSOCIATION WITH LIVE EVENTS

(71) Applicant: Snap Inc., Santa Monica, CA (US)

(72) Inventors: Adrian Bradford, Los Angeles, CA (US); Samuel Edward Hare, Los Angeles, CA (US); Yining Liang, Los Angeles, CA (US)

(73) Assignee: SNAP INC., Santa Monica, CA (US)

(*) Notice: Subject to any disclaimer, the term of this patent is extended or adjusted under 35 U.S.C. 154(b) by 274 days.

(21) Appl. No.: 18/498,897

(22) Filed: Oct. 31, 2023

(65) Prior Publication Data

US 2025/0142156 A1 May 1, 2025

Related U.S. Application Data

(60) Provisional application No. 63/496,871, filed on Apr. 18, 2023.

(51) Int. Cl.
*H04N 21/43* (2011.01)
*H04N 21/2187* (2011.01)
*H04N 21/431* (2011.01)

(52) U.S. Cl.
CPC ... *H04N 21/43072* (2020.08); *H04N 21/2187* (2013.01); *H04N 21/4316* (2013.01)

(58) Field of Classification Search
CPC ......... H04N 21/43072; H04N 21/2187; H04N 21/4316
See application file for complete search history.

(56) References Cited

U.S. PATENT DOCUMENTS

| | | | | |
|---|---|---|---|---|
| 10,325,410 | B1 * | 6/2019 | Smith | G06T 11/00 |
| 2011/0164163 | A1 | 7/2011 | Bilbrey et al. | |
| 2015/0319505 | A1 * | 11/2015 | Patadia | H04N 21/858 725/34 |
| 2016/0379410 | A1 * | 12/2016 | Sharma | G06F 16/487 345/633 |

(Continued)

OTHER PUBLICATIONS

"International Application Serial No. PCT US2024 024964, International Search Report mailed Jul. 10, 2024", 3 pgs.

(Continued)

*Primary Examiner* — Michael R Telan
(74) *Attorney, Agent, or Firm* — SCHWEGMAN LUNDBERG & WOESSNER, P.A.

(57) ABSTRACT

Aspects of the present disclosure involve a system comprising a storage medium storing a program and method for providing augmented reality content in association with a live event. The program and method provide for accessing first live video provided to a media server, the first live video having been captured by a camera in association with a live event; accessing timeline data stored by the media server, the timeline data for synchronizing effects with respect to the first live video; causing, based on the timeline data, an output device to display the first live video with preselected augmented reality content; and providing, to a plurality of client devices, an indication of the timeline data, each client device being configured to capture respective second live video and to display the respective second live video together with the augmented reality content based on the indication of the timeline data.

18 Claims, 11 Drawing Sheets

(56) References Cited

U.S. PATENT DOCUMENTS

| | | | | |
|---|---|---|---|---|
| 2020/0258307 | A1 | 8/2020 | Charlton et al. | |
| 2021/0389850 | A1* | 12/2021 | Charlton | G06F 3/04845 |

OTHER PUBLICATIONS

"International Application Serial No. PCT US2024 024964, Written Opinion mailed Jul. 10, 2024", 8 pgs.
"International Application Serial No. PCT/US2024/024964, International Preliminary Report on Patentability mailed Oct. 30, 2025", 10 pgs.

* cited by examiner

PROVIDING AUGMENTED REALITY IN ASSOCIATION WITH LIVE EVENTS

CROSS-REFERENCE TO RELATED APPLICATION

This patent application claims the benefit of U.S. Provisional Patent Application No. 63/496,871, filed Apr. 18, 2023, entitled "PROVIDING AUGMENTED REALITY IN ASSOCIATION WITH LIVE EVENTS", which is incorporated by reference herein in its entirety.

BACKGROUND

Systems such as interaction systems allow users to capture live video and incorporate augmented reality content with the live video.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Platforms such as live event visualization platforms typically allow users (e.g., live event designers/planners) to create and deliver live visual experiences. On the other hand, platforms such as interaction platforms allow users to capture live video and incorporate augmented reality content with the live video. As described herein, the disclosed embodiments provide a system which integrates the augmented reality content provided by an interaction platform with the visualization and design capabilities provided by a live event visualization platform.

The system includes a media server (e.g., corresponding to a live event visualization platform) configured for creating and delivering a live event. In example aspects, the media server implements a timeline for cueing parts of the live event to predefined visual and/or audio effects. The system provides for integrating augmented reality content (e.g., corresponding to content from the interaction platform) with the media server, such that the augmented reality content is presented based on cues within the timeline.

In example embodiments, the media server includes a media server designer (e.g., with a user interface) which interacts, via a predefined protocol, with an application (e.g., a conductor application) that includes the augmented reality logic. A user of the system can use the media server designer to integrate augmented reality with the live video captured via venue video cameras. The modified video is displayable on venue LED display(s) and can be broadcast to outside viewers (e.g., for watching on television, mobile device, etc.).

Moreover, the media server is configured to modify live video, captured on user devices of attendees, with the same or similar augmented reality content. The conductor application is configured to utilize a backend system for sending timeline-based cues to the attendee's user devices. In this manner, the attendees are able to view the augmented reality content on their respective user systems 102 (e.g., mobile phones), while also being able to experience augmented reality displayed on the LED display(s) within the venue of the live event.

Networked Computing Environment

Figure 1:
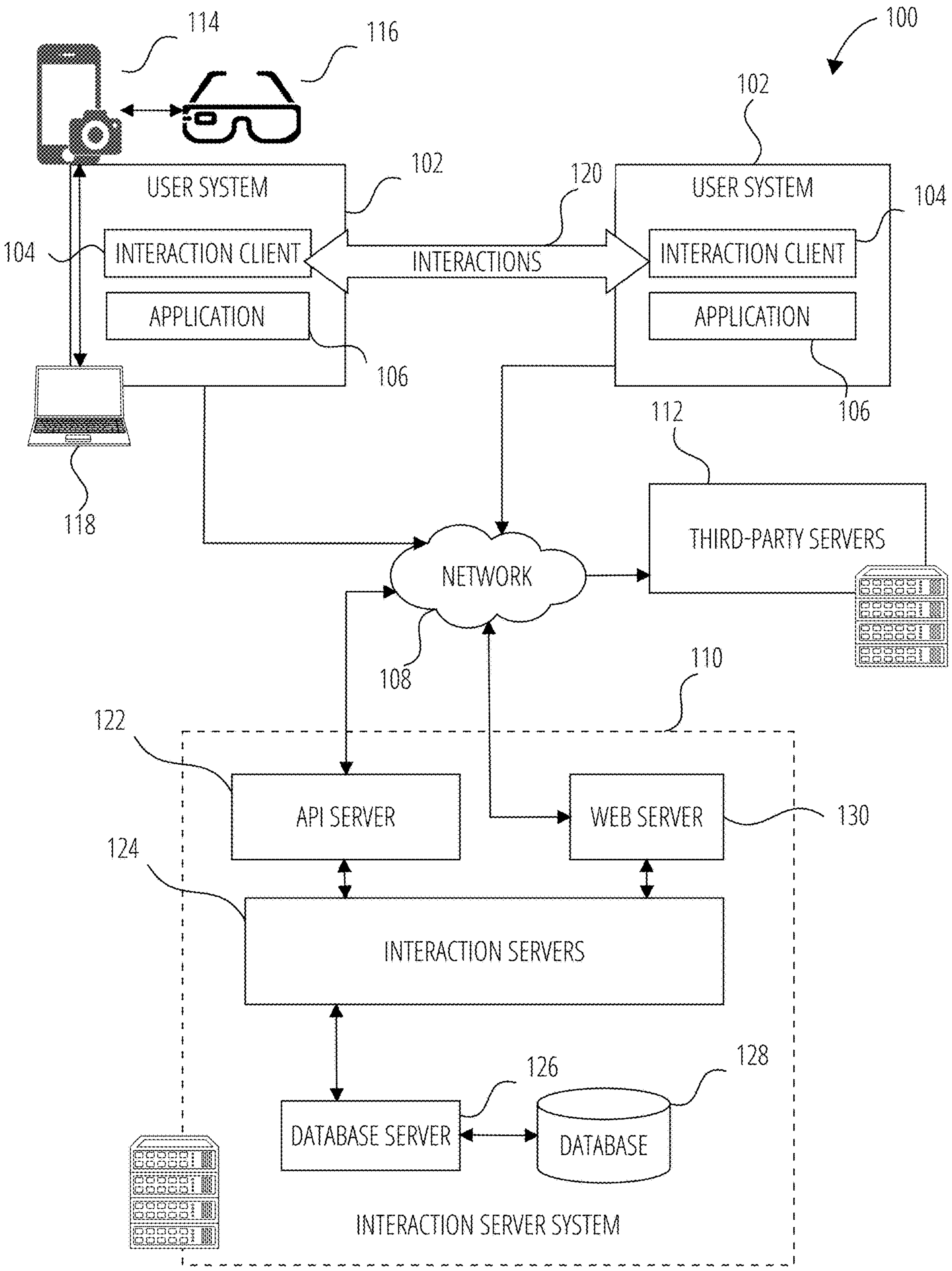
FIG. 1 is a diagrammatic representation for explaining a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a.*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
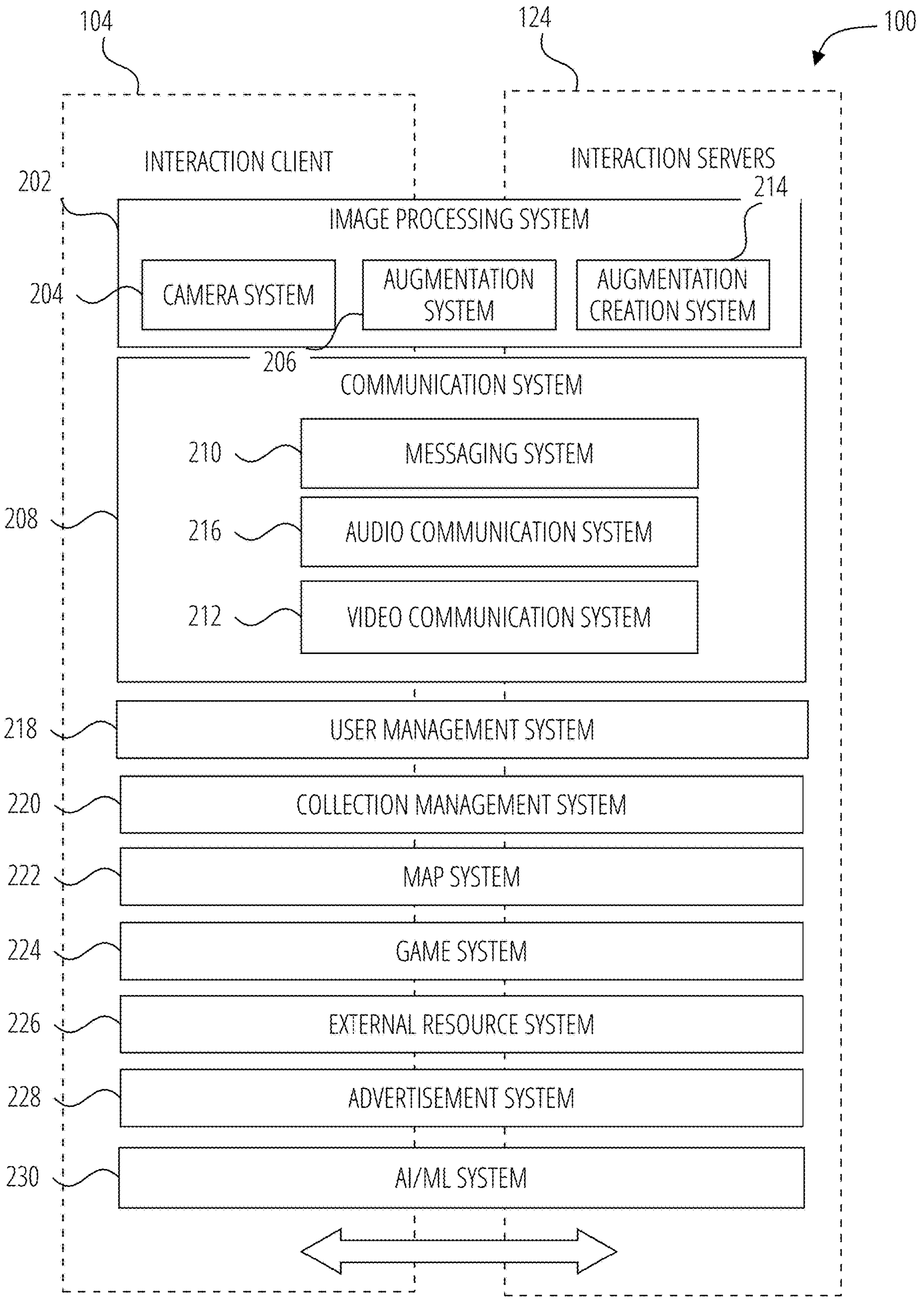
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

- Function logic: The function logic implements the functionality of the microservice subsystem, representing a specific capability or function that the microservice provides.
- API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.
- Service discovery: Microservice subsystems may find and communicate with other microservice subsystems of the interaction system 100. Service discovery mechanisms enable microservice subsystems to locate and communicate with other microservice subsystems in a scalable and efficient way.
- Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, based on a number of inputs and data, such as for example:

- Geolocation of the user system 102; and
- Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

In example embodiments, the game system 224 is configured to provide multiplayer session features. For example, as discussed below with respect to FIG. 5, the game system 224 is usable by the media server system 500 to provide augmented reality content to multiple user systems 102 (e.g., mobile devices). The augmented reality content is synchronized to a live event, for augmenting live video captured by the user systems 102 of users attending the live event.

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource.

In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
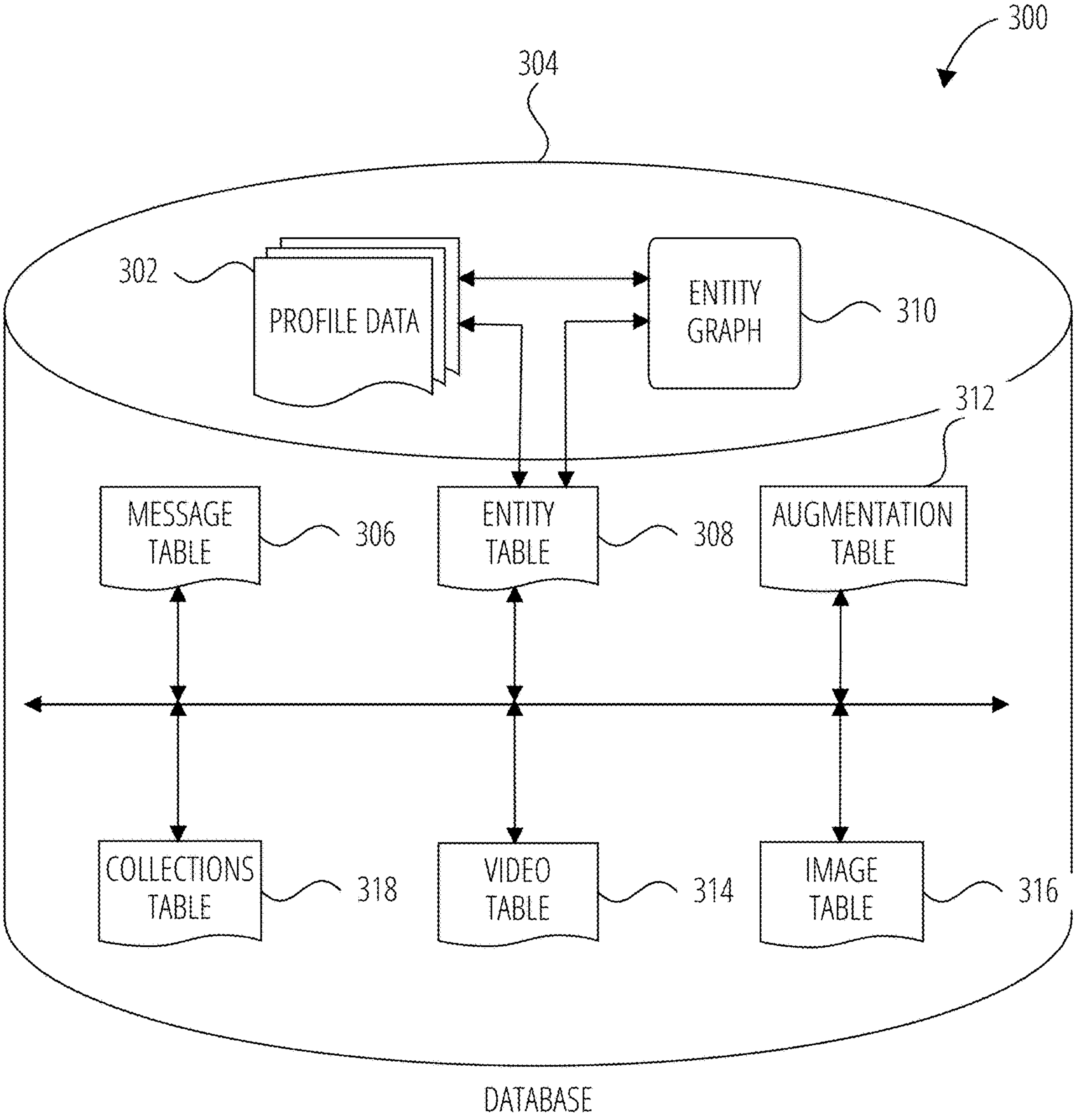
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
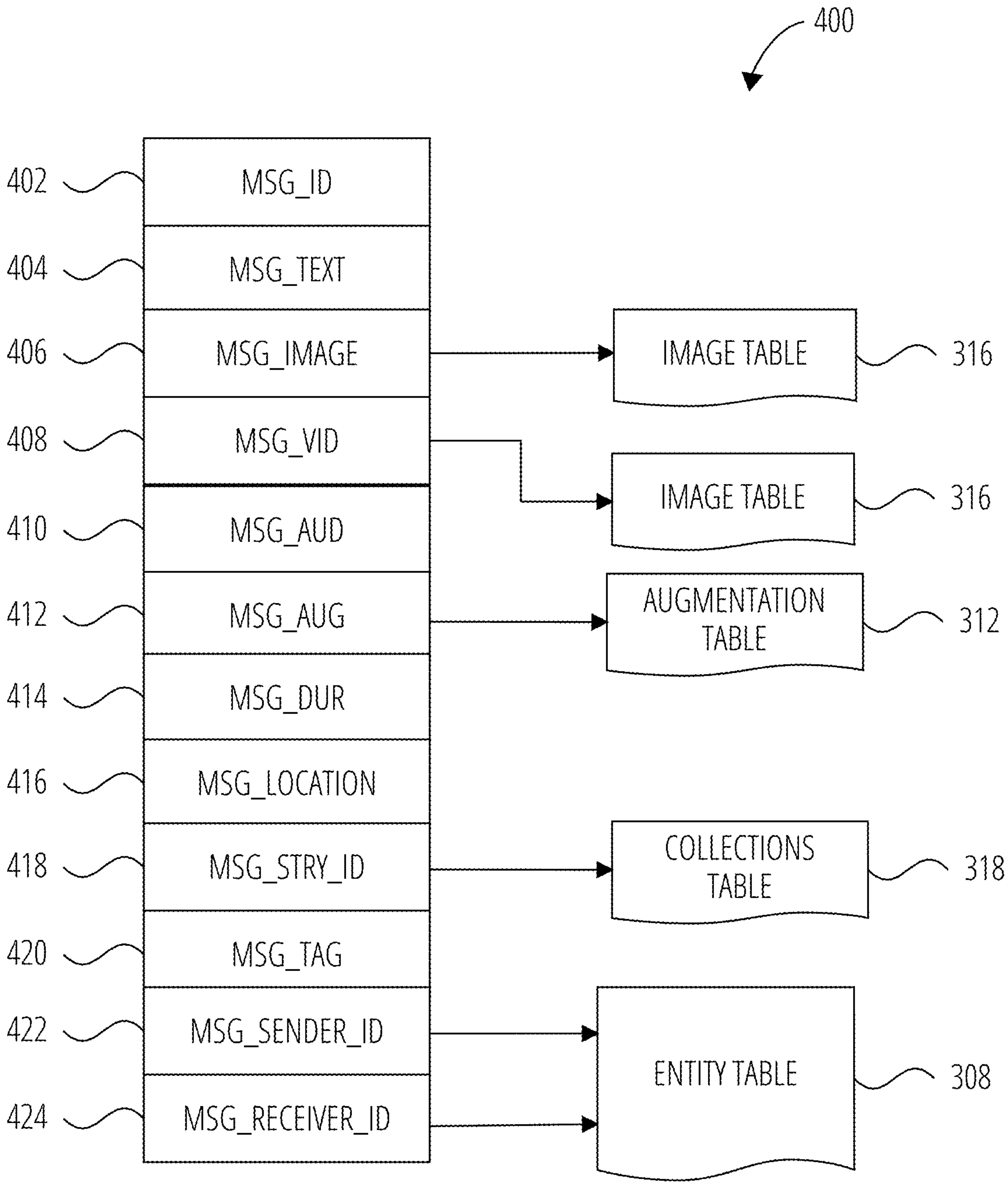
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.

- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Figure 5:
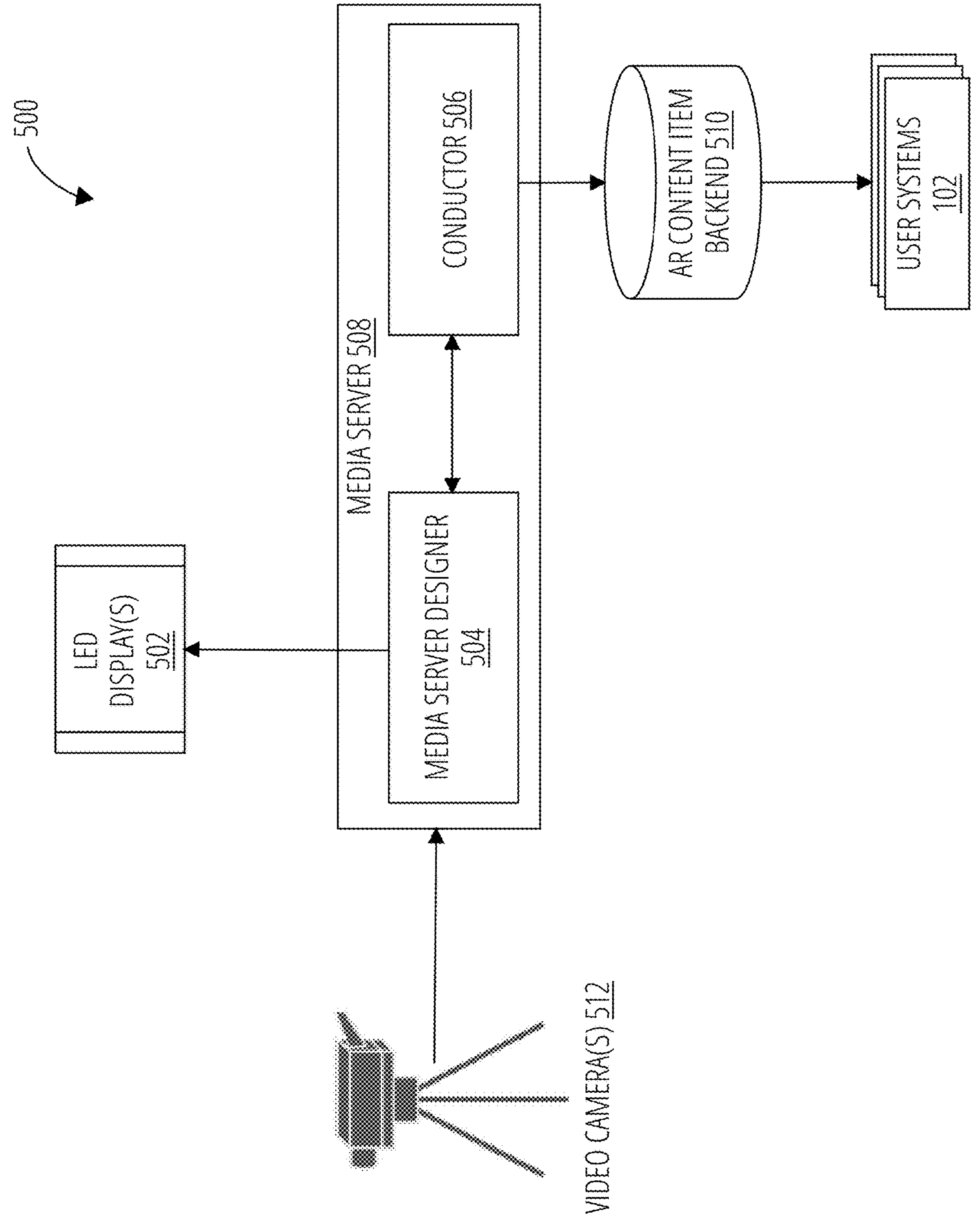
FIG. 5 is a block diagram showing an example media server system for providing augmented reality content in association with a live event, in accordance with some examples.

FIG. 5 is a block diagram showing an example media server system 500 for providing augmented reality content in association with a live event, in accordance with some examples. As shown in the example of FIG. 5, the media server system 500 includes one or more video camera(s) 512, one or more LED display(s) 502, a media server 508 including a media server designer 504 and a conductor 506, an AR content item backend 510 and user systems 102.

The media server 508 is communicatively coupled to each of the video camera(s) 512, the LED display(s) 502 and the AR content item backend 510. In addition, the AR content item backend 510 is communicatively coupled to the user systems 102. By way of non-limiting example, the connections between elements 502-510 and 102 correspond to wired and/or a wireless connections (e.g., using cellular communication components, Near Field Communication (NFC) components, Bluetooth® components, Wi-Fi® components and the like). In example embodiments, the video camera(s) 512 correspond to broadcast camera(s), and the LED display(s) 502 correspond to IMAG venue LED display(s).

As noted above with respect to FIG. 1, each of the user systems 102 is also communicatively coupled (e.g., via the network 108) to the interaction server system 110, to third-party servers 112 and/or to other user systems 102. In addition, each user system 102 may include multiple user devices, such as a mobile device 114 and/or a head-wearable apparatus 116 that are communicatively connected to exchange data and messages.

As described herein, the media server system 500 provides augmented reality content in association with a live event. By way of non-limiting example, a live event corresponds to one or more of a musical act (e.g., concert), theatrical act (e.g., including stand-up comedy), a play, a revue, a dance performance, a magic act, a disc jockey performance, and the like. In example embodiments, the media server 508 corresponds to a third-party platform configured for venue visualization and show control with respect to a live event. The media server 508 implements a timeline for cueing parts of the live event with predefined effects (e.g., changes in lighting, changes in sound, fireworks and/or other effects).

The media server system 500 provides for integrating augmented reality content provided by the interaction system 100 with the media server 508, such that the augmented reality content is presented based on cues within the timeline. Thus, a designer can configure the media server 508 to modify live video captured via the venue video camera(s) 512 with augmented reality content. The modified video is displayable on the LED display(s) 502 and/or may be broadcast to outside viewers (e.g., for watching on televisions, mobile devices, etc.).

The designer can also configure the media server 508 to modify live video, captured by respective user systems 102 (e.g., devices such mobile phones) of attendees at the venue, with the same or similar augmented reality content. In this manner, the attendees are able to view the augmented reality content on either or both of the LED display(s) 502 and their respective user systems 102 (e.g., mobile phones).

In example embodiments, the media server 508 refers to a physical server, for example, including one or more personal computers with a built-in platform including the media server designer 504. For example, the media server 508 includes software with three primary components: a timeline level, a stage level and a feed level. The media server 508 is configured to perform the mapping between these three levels in real time.

In example embodiments, the timeline level includes a timeline containing a number of content layers. The timeline provides a designer (e.g., end user of the media server 508) with user interfaces to create multiple layers of video or generative content, and to position the content on the timeline. The timeline also provides for adding keyframes, which allows the designer to controls properties such as playback speed, brightness, color, and the like. Moreover, multiple layers can be combined onto one single output canvas by using a selection of blending modes implemented by the media server 508.

In example embodiments, the stage level simulates the stage for a live event. The stage level includes user interfaces allowing the designer to create multiple screens with various shapes. The stage level user interfaces enable the designer to set the position, orientation, scale and resolution for each screen (e.g., each of the LED display(s) 502). In addition, each screen may have its own target canvas with an adjustable resolution. Moreover, the media server 508 provides for creating a virtual stage to simulate the real stage (e.g., the venue stage) that the media server 508 will be connected to during the live event. Content generated by the layers in the timeline is mapped onto the target canvases of the screens, allowing the designer to visualize the content in 3D from multiple (e.g., any) points of view.

In example embodiments, the feed level corresponds to connecting the media server 508 to output devices for the live event. While the example of FIG. 5 illustrates the LED display(s) 502, the media server 508 is not limited to such and can connect to alternative or additional devices such as projectors, plasma displays, stage lights, and the like. The feed level further allows for 2D output screen content to be formatted according to the requirements of the receiving output device (e.g., LED processor, projector, or lighting system).

Moreover, the media server 508 is configured to provide for real-time mapping between each of the timeline level, stage level and feed level. In example embodiments, changes to a particular level can be made independently of the others. For example, a change in the screen layout or output formatting does not necessarily require a change of content.

In the example of FIG. 5, the media server designer 504 corresponds to third-party software (e.g., with a user interface as discussed below with respect to FIG. 7) associated with the media server 508. The media server designer 504 is configured for a designer to visualize, design and sequence a production for a live event.

As described herein, a conductor 506 is implemented as a desktop application that runs on the media server 508. As discussed further below with respect to FIG. 6, the conductor 506 passes parameters and frames bidirectionally to the media server designer 504. Such passing of parameters and frames provides augmented reality content, as implemented by the interaction system 100 of FIG. 1, to the media server 508 with respect to a live event. Moreover, the conductor 506 is configured to interface with the AR content item backend 510, for synchronizing the augmented reality content with user systems 102 corresponding to attendees of the live event.

The conductor 506 is configured to run augmented reality content item(s) in association with the media server designer 504. For example, the augmented reality content items (e.g., lenses) are designed specifically for a particular live event. As discussed further below with respect to FIG. 8, the augmented reality content items may have a higher poly count for 3D modeling and/or larger textures than corresponding augmented reality content item(s) running on the user systems 102, and have write permissions to the AR content item backend 510. The conductor 506 is further configured to process and return incoming frames (e.g., live video as received from the video camera(s) 512) for display on the LED display(s) 502.

In addition, the conductor 506 is configured to transmit cues (e.g., cue IDs) and other parameters to the AR content item backend 510, for synchronizing with the user systems 102. In order to communicate from the media server designer 504 to end users at their respective user systems 102 at the venue, the media server system 500 includes the AR content item backend 510 that bridges the communication. Thus, the AR content item backend 510 is configured to receive the cues from the conductor 506, and to distribute the cues to the user systems 102.

As noted above, the user systems 102 are configured to run augmented reality content items (e.g., lenses) for presenting augmented reality content associated with the live event. In example embodiments, the AR content item backend 510 is configured to limit access of the augmented reality content item(s) associated with the live event via a geofence. For example, the AR content item backend 510 sets the geofence to correspond with the venue (e.g., within the venue and/or within a preset distance of the venue). In this manner, only those user systems 102 within the geofence are provided with access to he corresponding augmented reality content items.

In example embodiments, for each of the user systems 102, the augmented reality content item (e.g., lens) is placed in the first carousel position of a carousel interface displayed on the interaction client 104 running on the user system 102. For example, the carousel interface allows the user to cycle through and/or select different augmented reality content items, represented by respective icons, to apply with respect to captured video. The augmented reality content item (e.g., lens) associated with the live event is positioned first in the carousel interface, as an overlay within a shutter button or immediately adjacent to the shutter button. The shutter button is user-selectable to capture image data as a photo (e.g., in response to a tap gesture) or as a video (e.g., in response to a press-and-hold gesture).

As noted above, the conductor 506 is implemented a desktop application that runs on the media server 508. As discussed below, the conductor 506 is headless (e.g., the conductor 506 does not have a graphical user interface). As such, the augmented reality content item(s) for use during the live event, API details for the augmented reality content item(s), and other parameters (e.g., for interfacing with the conductor 506) are definable via a JSON file.

In example embodiments, the conductor 506 is automatically launched by a request made via the above-mentioned timeline implemented by the media server 508. For example, the request causes the conductor 506 to launch at the beginning of the live event (e.g., prior to the opening of venue doors). In this manner, the conductor 506 sets an appropriate cue ID corresponding to the beginning of the live event. On launch, the conductor 506 is configured to read the configuration file (e.g., JSON file), and to load the augmented reality content item(s) listed therein.

In example embodiments, the augmented reality content item(s) for use during the live event are stored and/or readable locally, and are not subject to existing size limits. As discussed further below with respect to FIG. 6, the conductor 506 is configured to load schema corresponding to the live event, and to connect with the media server designer 504 via a predefined protocol. For example, the protocol is proprietary to the media server system 500, and is configured to control third-party render engines (e.g., augmented reality content as implemented by the interaction system 100) via the media server designer 504.

Moreover, the conductor 506 is configured on launch to read input frames (as captured by the video camera(s) 512 and provided to the media server 508) and parameters via the protocol. The conductor 506 is further configured to process the input frames by applying augmented reality content thereto, and to return the processed frames over the protocol.

Examples of parameters set by the media server designer 504 include, but are not limited to: cue ID (e.g., used by the augmented reality content item running on the conductor 506 and passed to the AR content item backend 510 for the user systems 102); lens ID (e.g., when the media server designer 504 updates the Lens ID, the conductor 506 is configured to switch to the indicated augmented reality content item/lens); X-Y-Z coordinates for detected objects in captured video; camera position data; RGB color selections; and/or other parameters.

The conductor 506 is further configured on launch to establish a connection with the AR content item backend 510, and to continuously update the cue ID and other parameters (e.g., every n seconds). For example, when the augmented reality content item opens for each of the user systems 102, the user system 102 is able to determine the active live event cue. In a case where users of the user systems 102 open the augmented reality content item prior to the live event starting, the conductor 506 is configured to provide pre-event text and/or augmented reality elements to match the live event visuals for the given pre-event state.

During the live event, the conductor 506 is configured to continuously process incoming video frames and to make protocol calls based on the parameters last set by the media server designer 504. For example, the reason for such continuous processing is based at least in part on the conductor 506 being headless, and vision mixing and/or switching typically occurring elsewhere in the signal chain during the live event. The AR content item backend 510 is configured to pull parameters from the conductor 506, and to determine visuals corresponding to the current augmented reality content item. One such parameter is the cue ID, which is used to determine the state and/or visuals for the current augmented reality content item. In other examples, the AR content item backend 510 is configured to pull the Lens ID and/or other parameters from the conductor 506. Thus, cues from the timeline can be used to control parameters (e.g., scene cues, timing cues, color pickers, tracked object positioning, and the like) for the augmented reality content item.

When the live event concludes, the conductor 506 is configured to write a cue ID reserved to indicate the end of the live event before disconnecting. In this manner, each of the user systems 102 connected to the AR content item backend 510 may display a corresponding modal indicating the end of the live event (e.g., to differentiate from the case of an accidental disconnect).

In example embodiments, the AR content item backend 510 is configured to utilize the game system 224 (e.g., implemented by the interaction system 100) to provide the user systems 102 with access to the augmented reality content item(s). As noted above with respect to FIG. 2, the game system 224 is configured to provide multiplayer session features. For example, such multiplayer session features are usable by the AR content item backend 510 in order to provide augmented reality content to the user systems 102 in a one-to-many manner.

In example embodiments, the game system 224 provides for game storage (e.g., within the database 304). The AR content item backend 510 provides for a scoped persistent storage system by utilizing the game storage, and for appropriate remote procedure calls with respect to the game system 224. For example, the user systems 102 will read (e.g., and not write) data from game storage.

While the above examples of live events relate to music, sports, theater and dance, it is noted that the media server system 500 is not limited to such live events. The media server system 500 can also be used for large-scale interactive and/or experiential projects. For example, the media server 508 is configurable such that the user systems 102 (e.g., client devices) impact locally-rendered visuals, where inputs from sensors (e.g., LIDAR) are sent to the current augmented reality content item for visual effects.

Figure 6:
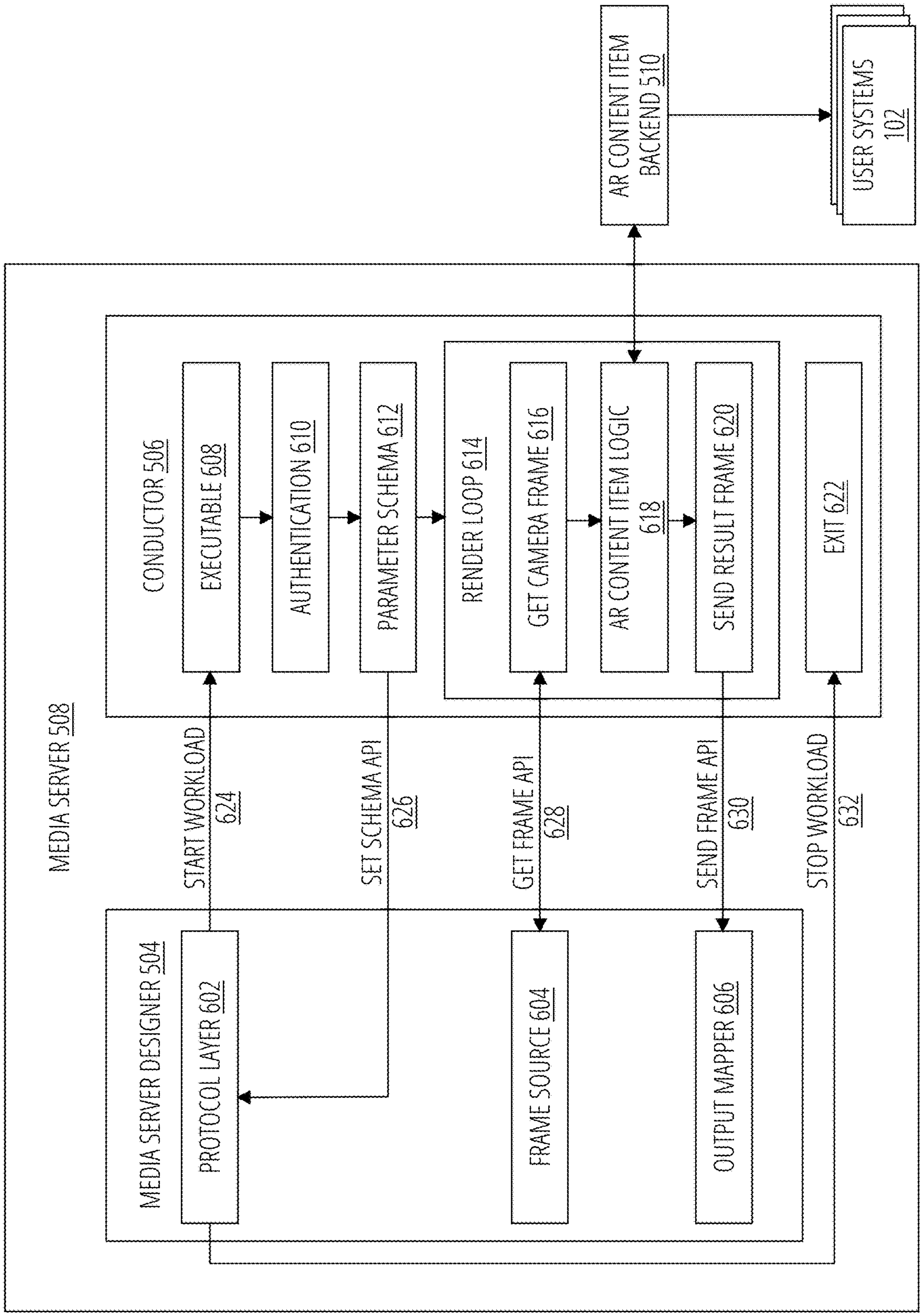
FIG. 6 is a block diagram illustrating further details regarding a media server, in accordance with some examples.

FIG. 6 is a block diagram illustrating further details regarding the media server 508, in accordance with some examples. As noted above with respect to FIG. 5, the media server 508 includes the media server designer 504 and the conductor 506. The example of FIG. 6 illustrates that each of the media server designer 504 and the conductor 506 include multiple subsystems, which may operate independently and communicate with other services.

As shown, the media server designer 504 includes a protocol layer 602, a frame source 604 and an output mapper 606. In addition, the conductor 506 incudes subsystems corresponding to an executable 608, an authentication 610, parameter schema 612, a render loop 614 (with get camera frame 616, AR content item logic 618 and send result frame 620), and an exit 622.

As noted above with respect to FIG. 5, the conductor 506 corresponds to a headless desktop application configured to perform interactions with the media server designer 504 over a protocol (e.g., a proprietary protocol). In the example of FIG. 6, the interactions include a start workload call 624, a set schema API call 626, a get frame API call 628, a send frame API call 630 and a stop workload call 632.

In example embodiments, the protocol layer 602 provides for a user (e.g., designer) to launch an executable file (e.g., an .exe file). As shown in FIG. 6, the start workload call 624 corresponds with starting the executable 608 (e.g., launching the conductor 506). In example embodiments, the conductor 506 is configured for command-line interface (CLI) arguments that are set in a widget that is separate from the executable file.

After starting the executable, the conductor 506 requests authentication 610. In example embodiments, the conductor 506 is configured to make authentication requests using a first-party application scope corresponding to the interaction system 100. In this manner, an authorized user (e.g., a designer) at the live event authenticates via the interaction system 100.

In example embodiments, the authorized user may be an employee of the entity (e.g., company) owning the interaction system 100. For example, the media server 508 as described herein is modified and owned by the entity (e.g., company) corresponding to the interaction system 100. The media server 508 is modified to include the conductor 506 (e.g., with logic corresponding to the interaction system 100), and the conductor 506 interfaces with the media server designer 504 and the AR content item backend 510. Thus, the authorized user may correspond to a point of contact of the entity (e.g., company) for integrating augmented reality implemented by the interaction system 100 with the media server 508.

Following the authentication 610, the conductor 506 sets parameter schema 612. For example, the parameter schema specifies what type of parameters are registered to the media server designer 504, so that the media server designer 504 can directly observe/update the parameters in real time.

The frame source 604 corresponds to a media source. As noted above, the example of FIG. 5 illustrates the media source as the video camera(s) 512 which are configured to capture real-time video of the live event. As discussed further below with respect to FIG. 7, the frame source 604 may be mapped to a texture parameter. The frame source 604 is provided, via the get frame API call 628, to the get camera frame 616 subsystem, which is part of the render loop 614.

In example embodiments, the render loop 614 corresponds to the main loop for the conductor 506. The render loop 614 is configured to process the frames provided by the frame source 604 with augmented reality content. The logic for a particular augmented reality content item (e.g., lens) is included within the AR content item logic 618. The processed frame is provided to the send result frame 620 subsystem.

The send result frame 620 subsystem provides for sending the processed frame, which includes augmented reality content, to the output mapper 606 via the send frame API call 630. The output mapper 606 is configured to map the resulting frame to an output device (e.g., the LED display(s) 502).

In example embodiments, camera tracking data is sent from IR sensors on the video camera(s) 512 to the media server 508. This data is then sent to the AR content item logic 618 (e.g., via the above-noted protocols), and functions as a camera transform, thereby permitting detected objects for augmented reality content to remain in position relative to the physical space through camera movements.

In example embodiments, the media server 508 is configured execute multi-camera broadcast shoots. For example, it is possible to run multiple instances of the conductor 506 (e.g., with the AR content item logic 618) across a number of media servers 508. In this manner, the same scene can be captured from multiple perspectives (e.g., as expected for broadcast workflows). Scenes requiring randomization may use a seed picked up from the timeline, to ensure that instances remain frame-accurate.

As discussed above with respect to FIG. 5, the AR content item backend 510 corresponds to a game system 224 deployment with backend logic. In example embodiments, an augmented reality content item running on the conductor 506 is provided with permission to write to the AR content item backend 510 (e.g., the AR content item logic 618 can write to the AR content item backend 510). However, the augmented reality content items running on the user systems 102 are limited to reading from, and not writing to, the custom backend.

As noted above, the conductor 506 is configured to authenticate after the executable 608 is started. With respect to the render loop 614, the conductor 506 is further configured to perform authentication for the users of the user system 102. During the first authentication of a user at a respective user system 102, the user is redirected to a user interface to login to their user account on the interaction system 100. For example, the user interface initially prompts the user to confirm that they wish to connect (e.g., via a "connect to Venue AR?" prompt) before the user inputs authentication credentials. In example embodiments, the corresponding authentication tokens are used to make connections to the AR content item backend 510 (e.g., corresponding to the game system 224) while running an augmented reality content item that uses multiplayer session features.

With further respect to authentication, a text file may be saved locally on the media server 508 with the authentication token retrieved from user account data associated with the interaction system 100. The authentication token is usable during the render loop 614 when a the AR content item logic 618 makes a connection to the AR content item backend 510. For example, this approach is used because each new authentication requires the user input to login via a browser with a confirmation graphical user interface.

Figure 7:
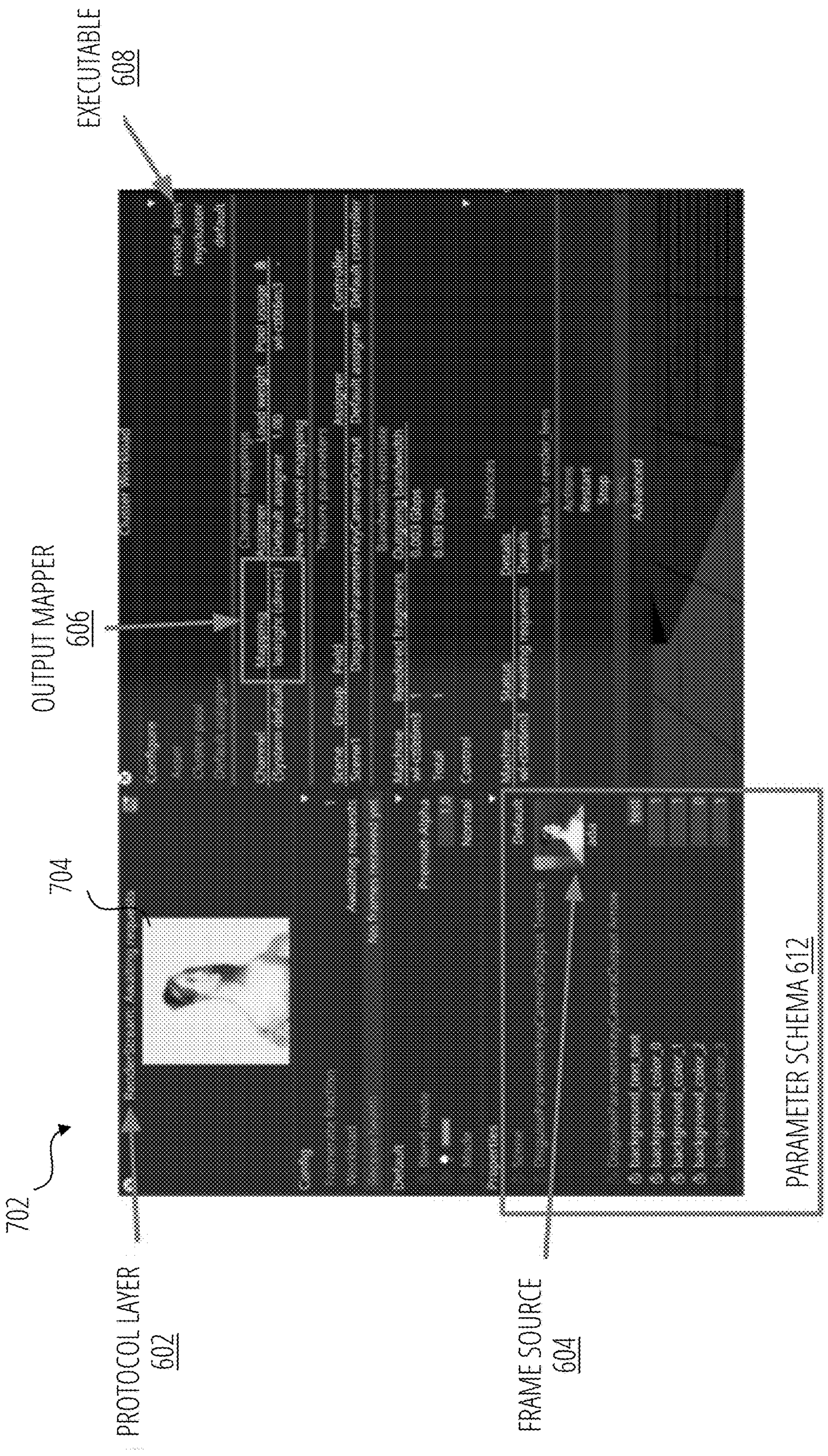
FIG. 7 illustrates a user interface corresponding to a media server designer, in accordance with some examples.

FIG. 7 illustrates the user interface 702 corresponding to the media server designer 504, in accordance with some examples. As shown in the example of FIG. 7, the user interface 702 includes interface elements corresponding to the protocol layer 602, the frame source 604, the output mapper 606 and the executable 608 depicted in FIG. 6.

As noted above, the media server system 500 provides a command-line interface (CLI) option that allows a user (e.g., designer) to run an executable file (e.g., executable 608) in a loop that communicates with media server designer 504 over the protocol layer 602. The protocol layer 602 provides for the user to select and to launch the executable file. In the example of FIG. 7, the executable file is named "rens_lender.exe" and corresponds to launching the conductor 506. As noted above, CLI arguments are set in another widget.

The user interface 702 further provides for the user to set the parameter schema 612, to specify the parameters that are registered to the media server designer 504 for real-time updates. In the example of FIG. 7, the user specifies a texture parameter, a text parameter and float parameters (e.g., representing a color). Moreover, the background color (e.g., yellow) is shown as background output 704 within the user interface 702.

As noted above, the frame source 604 corresponds to a media source (e.g., frames provided by the video camera(s) 512). The frame source 604 may be mapped to a texture parameter. Moreover, after the AR content item logic 618 processes a frame from the frame source 604, the resulting frame with augmented reality content is provided to the output mapper 606. The output mapper 606 is configured to map the resulting frame to an output device (e.g., one or more of the LED display(s) 502).

Figure 8:
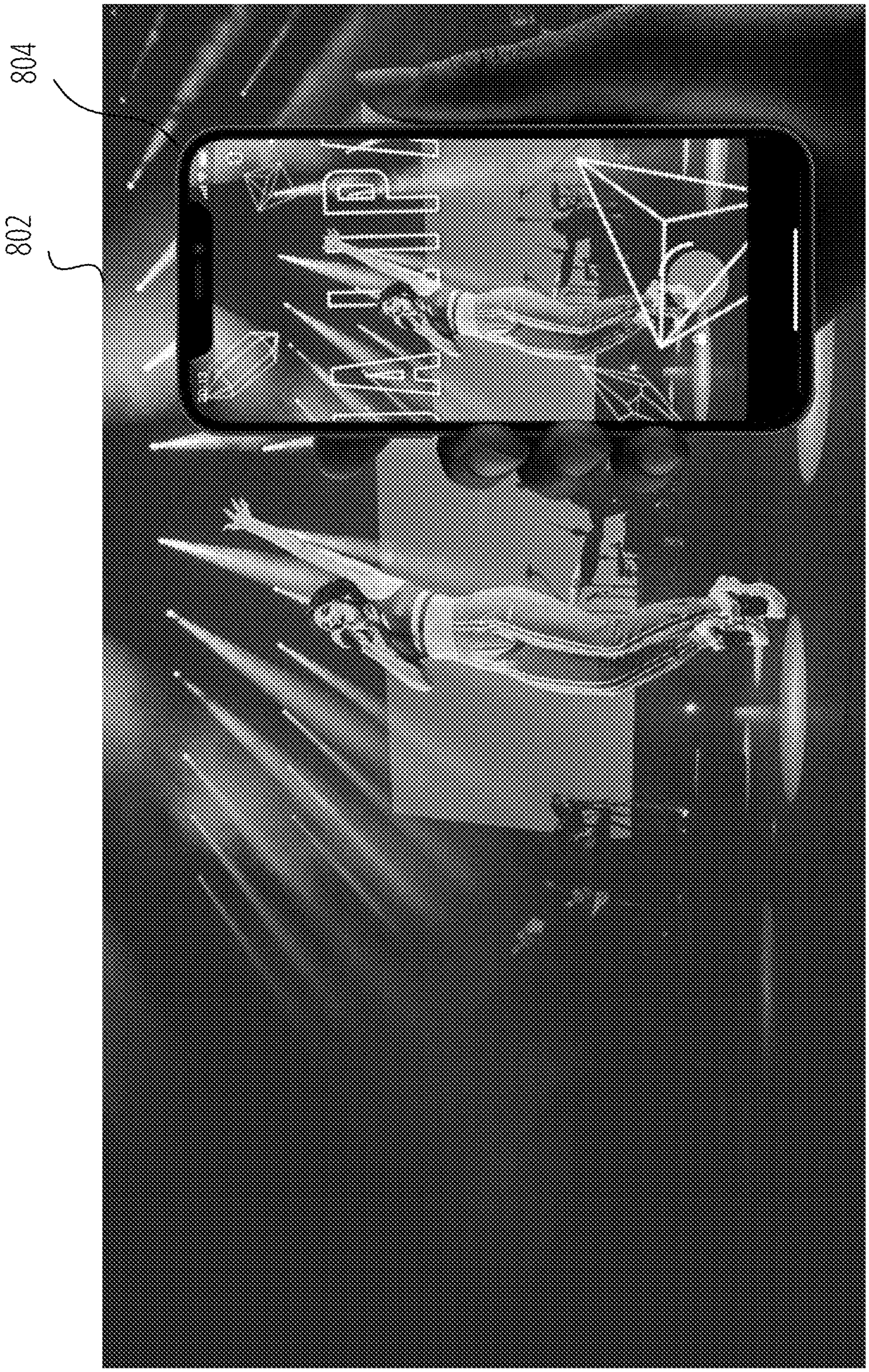
FIG. 8 illustrates an example of displaying augmented reality content on both the LED display(s) and a user system for a live event, in accordance with some examples.

FIG. 8 illustrates an example of displaying augmented reality content on both the LED display(s) 502 and a user system 102 for a live event, in accordance with some examples. As noted above, the media server system 500 is configured to incorporate augmented reality content with image data (e.g., live video) captured by venue video camera(s) 512. In the example of FIG. 8, the LED display output 802 corresponds to the display of the live video, as processed by the conductor 506 to include augmented reality content, on the LED display(s) 502.

In addition, the media server system 500 is configured to incorporate the augmented reality content with image data (e.g., live video) as captured by the user systems 102. In the example of FIG. 8, the user system screen output 804 corresponds to the display of the live video, as captured by a respective user system 102 and processed in conjunction with the AR content item backend 510 to include augmented reality content, on the respective user system 102.

As noted above, the augmented reality content item for the LED display output 802 may have higher poly count for 3D modeling and/or larger textures than the counterpart augmented reality content item for the user system screen output 804. For example, the media server 508 is configured to use higher resolution graphics with respect to the LED display(s) 502 (e.g., and for broadcast), since these graphics are being rendered on servers. In addition, lower resolution graphics (e.g., proxy versions) may be used with respect to the user systems 102, since the output will likely appear the same or nearly the same on a smaller screen, and since the rendering is less computationally intensive.

Figure 9:
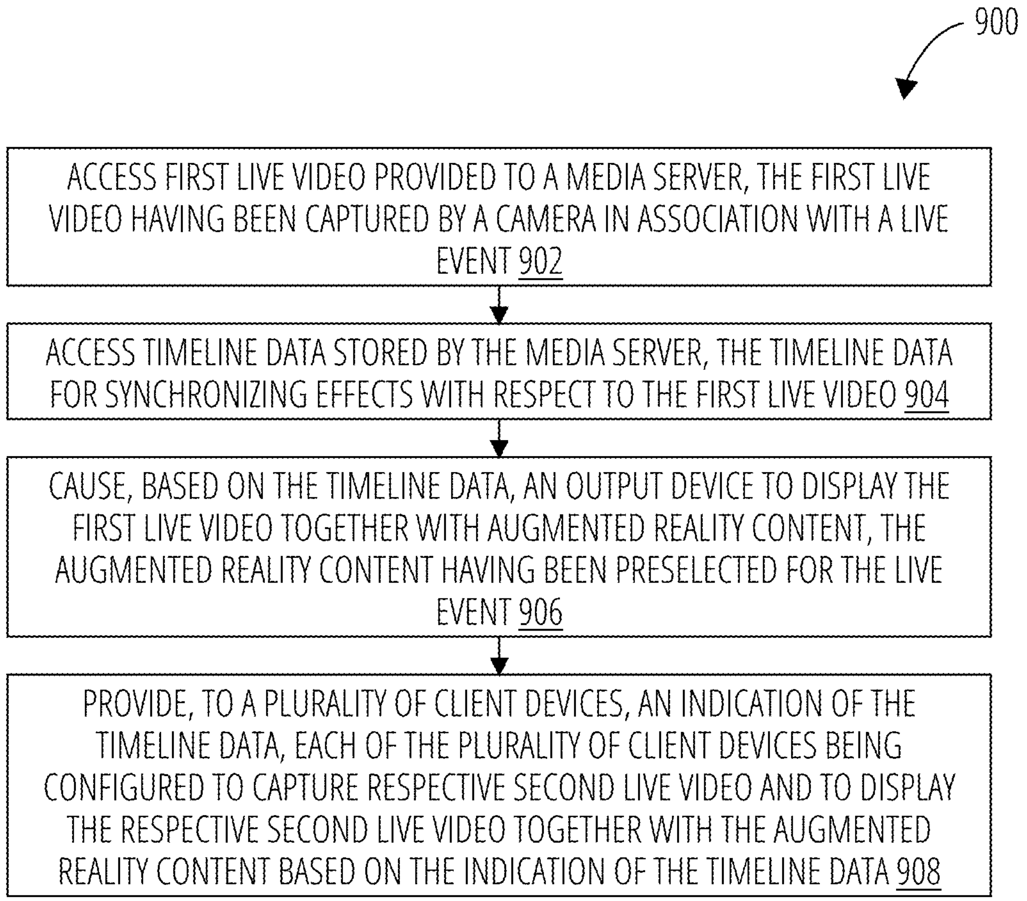
FIG. 9 is a flowchart illustrating a process for providing augmented reality content in association with a live event, in accordance with some examples.

FIG. 9 is a flowchart illustrating a process 900 for providing augmented reality content in association with a live event, in accordance with some examples. For explanatory purposes, the process 900 is primarily described herein with reference to the conductor 506 of FIG. 5 and FIG. 6. However, one or more blocks (or operations) of the process 900 may be performed by one or more other components, and/or by other suitable devices. Further for explanatory purposes, the blocks (or operations) of the process 900 are described herein as occurring in serial, or linearly. However, multiple blocks (or operations) of the process 900 may occur in parallel or concurrently. In addition, the blocks (or operations) of the process 900 need not be performed in the order shown and/or one or more blocks (or operations) of the process 900 need not be performed and/or can be replaced by other operations. The process 900 may be terminated when its operations are completed. In addition, the process 900 may correspond to a method, a procedure, an algorithm, etc.

At block 902, the conductor 506 accesses first live video provided to a media server (e.g., the media server 508), the first live video having been captured by a camera (e.g., the video camera(s) 512) in association with a live event. The conductor 506 accesses timeline data stored by the media server, the timeline data for synchronizing effects with respect to the first live video (block 904).

The conductor 506 causes, based on the timeline data, an output device (e.g., the LED display(s) 502) to display the first live video together with augmented reality content, the augmented reality content having been preselected for the live event (block 906). For example, the augmented reality content is provided by an augmented reality content item that is preselected for the live event, the augmented reality content item being associated with an interaction system that is separate from the media server.

The augmented reality content item may be loaded for the conductor 506, which corresponds to a desktop application running on the media server. The conductor 506 is configured to interface with a media server designer for visualizing, designing and sequencing effects for the live event. Causing the output device to display the first live video together with augmented reality content further is based on loading the augmented reality content item for the conductor 506.

The conductor 506 provides, to a plurality of client devices (e.g., the user systems 102), an indication of the timeline data, each of the plurality of client devices being configured to capture respective second live video and to display the respective second live video together with the augmented reality content based on the indication of the timeline data (block 908). The conductor 506 is configured to load the augmented reality content item for the plurality of client devices. Display of the respective second live video together with the augmented reality content is further based on loading the augmented reality content item for the plurality of client devices.

In example embodiments, the indication of the timeline data comprises a cue ID for synchronizing the augmented reality content with the first live video for display on the output device, and for synchronizing the augmented reality content with the respective second live video for display on the plurality of client devices.

In example embodiments, the live event is presented at a venue, and the camera and the output device are positioned at the venue. For each of the plurality of client devices, access to the augmented reality content may be based on a geofenced area corresponding to the venue. The conductor 506 is configured to cause the first live video together with the augmented reality content to be broadcast to a second plurality of client devices (e.g., televisions, mobile devices and/or other display devices outside of the venue).

Machine Architecture

Figure 10:
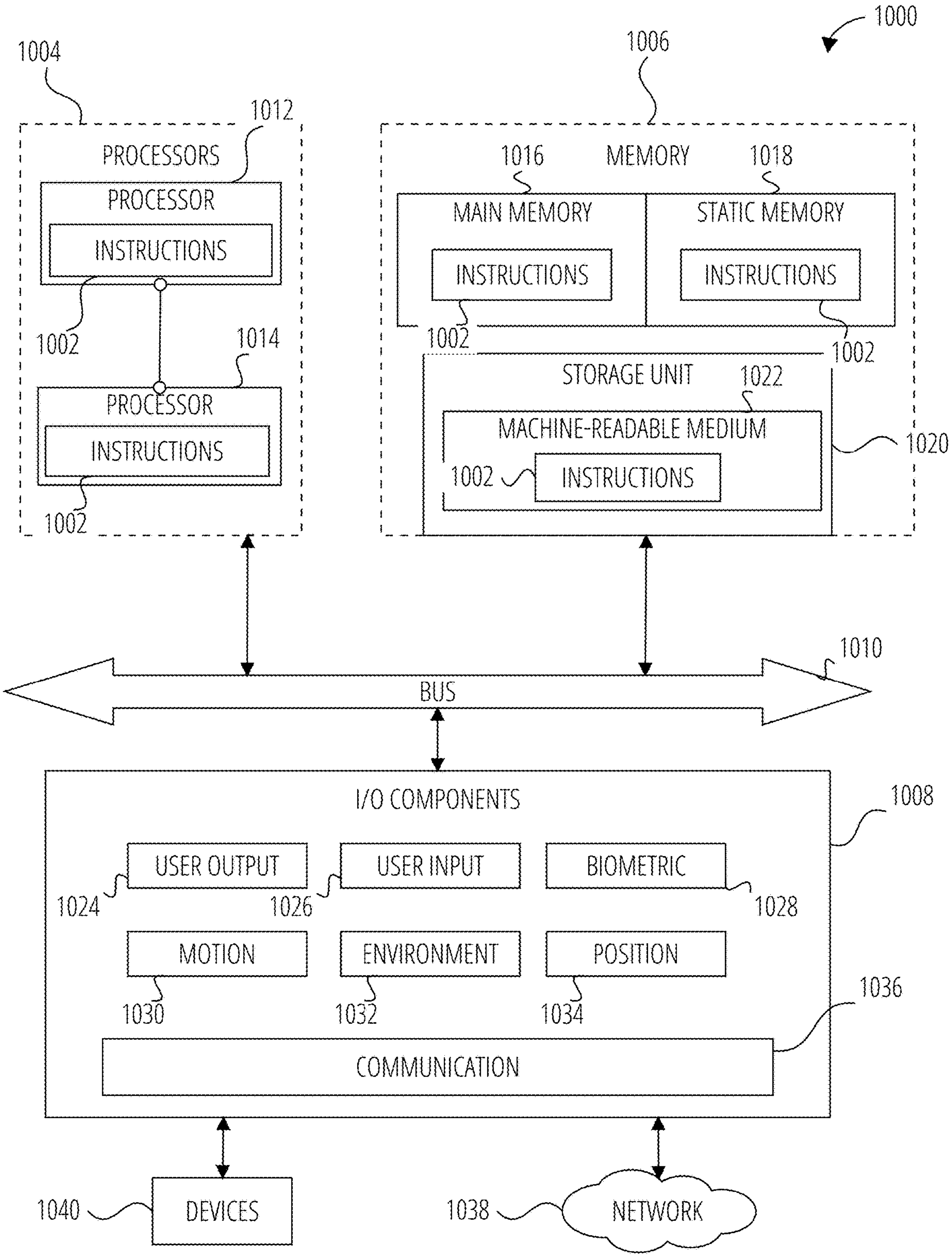
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
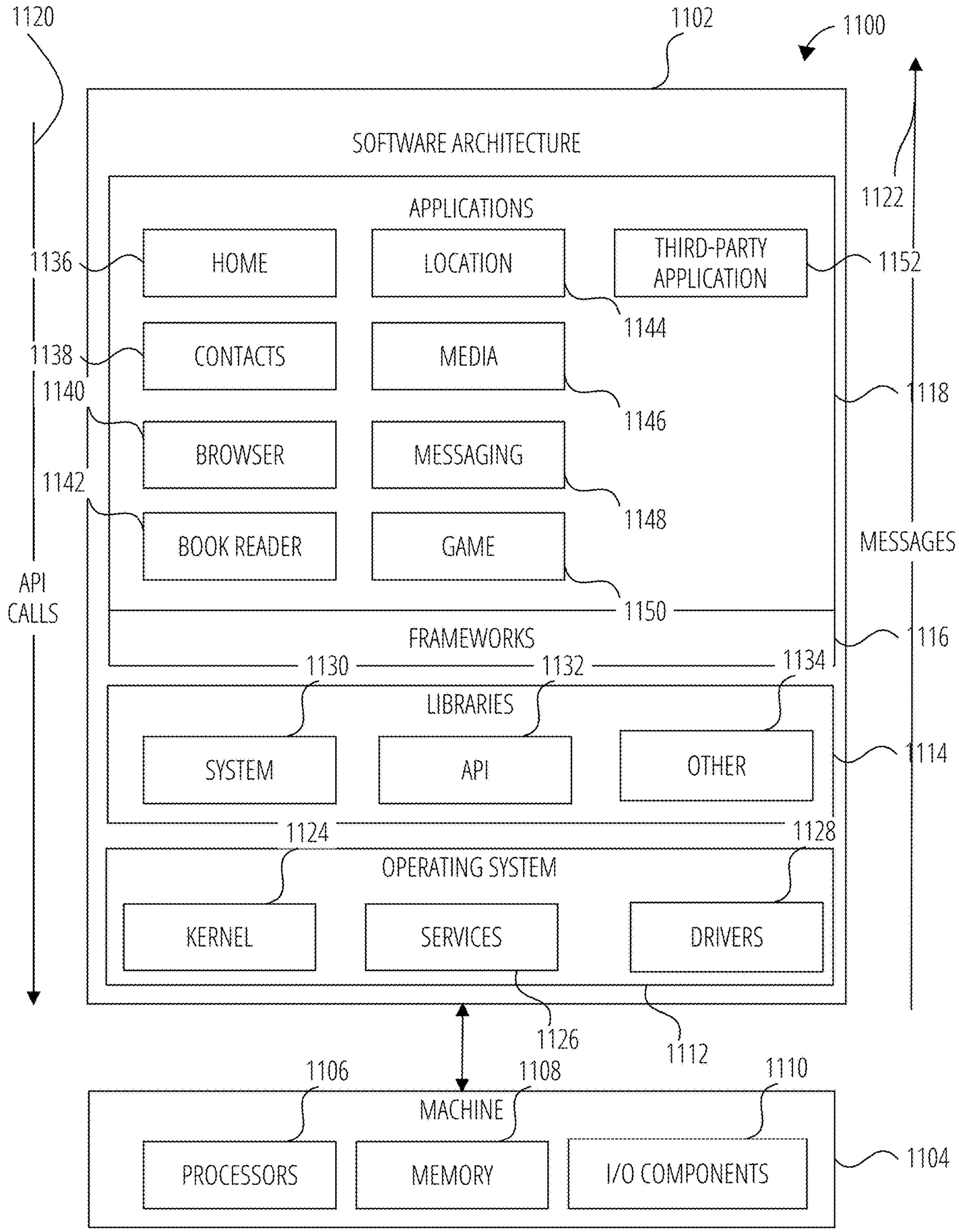
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

EXAMPLES

Example 1 is a system comprising: at least one processor; at least one memory component storing instructions that, when executed by the at least one processor, cause the at least one processor to perform operations comprising: accessing first live video provided to a media server, the first live video having been captured by a camera in association with a live event; accessing timeline data stored by the media server, the timeline data for synchronizing effects with respect to the first live video; causing, based on the timeline data, an output device to display the first live video together with augmented reality content, the augmented reality content having been preselected for the live event; and providing, to a plurality of client devices, an indication of the timeline data, each of the plurality of client devices being configured to capture respective second live video and to display the respective second live video together with the augmented reality content based on the indication of the timeline data.

In Example 2, the subject matter of Example 1 includes, wherein the indication of the timeline data comprises a cue ID for synchronizing the augmented reality content with the first live video for display on the output device, and for synchronizing the augmented reality content with the respective second live video for display on the plurality of client devices.

In Example 3, the subject matter of Examples 1-2 includes, wherein the augmented reality content is provided by an augmented reality content item that is preselected for the live event, the augmented reality content item being associated with an interaction system that is separate from the media server.

In Example 4, the subject matter of Example 3 includes, the operations further comprising: loading the augmented reality content item for a desktop application running on the media server, the desktop application being configured to interface with a media server designer for visualizing, designing and sequencing effects for the live event, wherein causing the output device to display the first live video together with augmented reality content further is based on loading the augmented reality content item for the desktop application.

In Example 5, the subject matter of Examples 3-4 includes, the operations further comprising: loading the augmented reality content item for the plurality of client devices, wherein display of the respective second live video together with the augmented reality content is further based on loading the augmented reality content item for the plurality of client devices.

In Example 6, the subject matter of Examples 1-5 includes, wherein the live event is presented at a venue, and wherein the camera and the output device are positioned at the venue.

In Example 7, the subject matter of Example 6 includes, wherein for each of the plurality of client devices, access to the augmented reality content is based on a geofenced area corresponding to the venue.

In Example 8, the subject matter of Example 7 includes, the operations further comprising: causing the first live video together with the augmented reality content to be broadcast to a second plurality of client devices.

In Example 9, the subject matter of Examples 1-8 includes, wherein the camera is a video camera and the output device is a light-emitting diode (LED) display.

Example 10 is a method comprising: accessing first live video provided to a media server, the first live video having been captured by a camera in association with a live event; accessing timeline data stored by the media server, the timeline data for synchronizing effects with respect to the first live video; causing, based on the timeline data, an output device to display the first live video together with augmented reality content, the augmented reality content having been preselected for the live event; and providing, to a plurality of client devices, an indication of the timeline data, each of the plurality of client devices being configured to capture respective second live video and to display the respective second live video together with the augmented reality content based on the indication of the timeline data.

In Example 11, the subject matter of Example 10 includes, wherein the indication of the timeline data comprises a cue ID for synchronizing the augmented reality content with the first live video for display on the output device, and for synchronizing the augmented reality content with the respective second live video for display on the plurality of client devices.

In Example 12, the subject matter of Examples 10-11 includes, wherein the augmented reality content is provided by an augmented reality content item that is preselected for the live event, the augmented reality content item being associated with an interaction system that is separate from the media server.

In Example 13, the subject matter of Example 12 includes, loading the augmented reality content item for a desktop application running on the media server, the desktop application being configured to interface with a media server designer for visualizing, designing and sequencing effects for the live event, wherein causing the output device to display the first live video together with augmented reality content further is based on loading the augmented reality content item for the desktop application.

In Example 14, the subject matter of Examples 12-13 includes, loading the augmented reality content item for the plurality of client devices, wherein display of the respective second live video together with the augmented reality content is further based on loading the augmented reality content item for the plurality of client devices.

In Example 15, the subject matter of Examples 10-14 includes, wherein the live event is presented at a venue, and wherein the camera and the output device are positioned at the venue.

In Example 16, the subject matter of Example 15 includes, wherein for each of the plurality of client devices, access to the augmented reality content is based on a geofenced area corresponding to the venue.

In Example 17, the subject matter of Example 16 includes, causing the first live video together with the augmented reality content to be broadcast to a second plurality of client devices.

In Example 18, the subject matter of Examples 10-17 includes, wherein the camera is a video camera and the output device is a light-emitting diode (LED) display.

Example 19 is a non-transitory computer-readable storage medium storing instructions that, when executed by at least one processor, cause the at least one processor to perform operations comprising: accessing first live video provided to a media server, the first live video having been captured by a camera in association with a live event; accessing timeline data stored by the media server, the timeline data for synchronizing effects with respect to the first live video; causing, based on the timeline data, an output device to display the first live video together with augmented reality content, the augmented reality content having been preselected for the live event; and providing, to a plurality of client devices, an indication of the timeline data, each of the plurality of client devices being configured to capture respective second live video and to display the respective second live video together with the augmented reality content based on the indication of the timeline data.

In Example 20, the subject matter of Example 19 includes, wherein the indication of the timeline data comprises a cue ID for synchronizing the augmented reality content with the first live video for display on the output device, and for synchronizing the augmented reality content with the respective second live video for display on the plurality of client devices.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:

at least one processor;

at least one memory component storing instructions that, when executed by the at least one processor, cause the at least one processor to perform operations comprising:

accessing first live video provided to a media server located at a venue of a live event, the first live video having been captured by a first camera positioned at the venue in association with the live event;

accessing timeline data stored by the media server, the timeline data comprising a sequence of cues, each cue specifying a respective portion of augmented reality content preselected for the live event to be applied with respect to the first live video during the live event;

generating, by the media server during the live event, a composited video stream by applying the respective portion of augmented reality content specified by a current cue of the sequence of cues to the first live video;

causing, based on the timeline data, an output device positioned at the venue to display the composited video stream concurrently with the live event; and contemporaneously providing, over a network from the media server to each of a plurality of client devices located at the venue, an indication of the current cue, each of the plurality of client devices comprising a respective second camera configured to capture respective second live video in association with the live event, and each of the plurality of client devices being configured to render, locally at the client device and based on the indication of the current cue, the respective portion of augmented reality content specified by the current cue onto the respective second live video concurrently with the live event.

2. The system of claim 1, wherein the indication of the current cue comprises a cue ID for synchronizing the augmented reality content with the first live video for display on the output device, and for synchronizing the augmented reality content with the respective second live video for display on the plurality of client devices.

3. The system of claim 1, wherein the augmented reality content is provided by an augmented reality content item that is preselected for the live event, the augmented reality content item being associated with an interaction system that is separate from the media server.

4. The system of claim 3, the operations further comprising:

loading the augmented reality content item for a desktop application running on the media server, the desktop application being configured to interface with a media server designer for visualizing, designing and sequencing effects for the live event, wherein causing the output device to display the composited video stream reality content further is based on loading the augmented reality content item for the desktop application.

5. The system of claim 3, the operations further comprising:

loading the augmented reality content item for the plurality of client devices, wherein rendering of the augmented reality content onto the respective second live video is further based on loading the augmented reality content item for the plurality of client devices.

6. The system of claim 1, wherein for each of the plurality of client devices, access to the augmented reality content is based on a geofenced area corresponding to the venue.

7. The system of claim 6, the operations further comprising:

causing the composited video stream to be broadcast to a second plurality of client devices.

8. The system of claim 1, wherein the first camera is a video camera and the output device is a light-emitting diode (LED) display.

9. A method comprising:

accessing first live video provided to a media server located at a venue of a live event, the first live video having been captured by a first camera positioned at the venue in association with the live event;

accessing timeline data stored by the media server, the timeline data comprising a sequence of cues, each cue specifying a respective portion of augmented reality content preselected for the live event to be applied with respect to the first live video during the live event;

generating, by the media server during the live event, a composited video stream by applying the respective portion of augmented reality content specified by a current cue of the sequence of cues to the first live video;

causing, based on the timeline data, an output device positioned at the venue to display the composited video stream concurrently with the live event; and contemporaneously providing, over a network from the media server to each of a plurality of client devices located at the venue, an indication of the current cue, each of the plurality of client devices comprising a respective second camera configured to capture respective second live video in association with the live event, and each of the plurality of client devices being configured to render, locally at the client device and based on the indication of the current cue, the respective portion of augmented reality content specified by the current cue onto the respective second live video concurrently with the live event.

10. The method of claim 9, wherein the indication of the current cue comprises a cue ID for synchronizing the augmented reality content with the first live video for display on the output device, and for synchronizing the augmented reality content with the respective second live video for display on the plurality of client devices.

11. The method of claim 9, wherein the augmented reality content is provided by an augmented reality content item that is preselected for the live event, the augmented reality content item being associated with an interaction system that is separate from the media server.

12. The method of claim 11, further comprising:

loading the augmented reality content item for a desktop application running on the media server, the desktop application being configured to interface with a media server designer for visualizing, designing and sequencing effects for the live event, wherein causing the output device to display the composited video stream reality content further is based on loading the augmented reality content item for the desktop application.

13. The method of claim 11, further comprising:

loading the augmented reality content item for the plurality of client devices, wherein rendering of the augmented reality content onto the respective second live video is further based on loading the augmented reality content item for the plurality of client devices.

14. The method of claim 9, wherein for each of the plurality of client devices, access to the augmented reality content is based on a geofenced area corresponding to the venue.

15. The method of claim 14, further comprising:

causing the composited video stream to be broadcast to a second plurality of client devices.

16. The method of claim 9, wherein the first camera is a video camera and the output device is a light-emitting diode (LED) display.

17. A non-transitory computer-readable storage medium storing instructions that, when executed by at least one processor, cause the at least one processor to perform operations comprising:

accessing first live video provided to a media server located at a venue of a live event, the first live video having been captured by a first camera positioned at the venue in association with the live event;

accessing timeline data stored by the media server, the timeline data comprising a sequence of cues, each cue specifying a respective portion of augmented reality content preselected for the live event to be applied with respect to the first live video during the live event;

generating, by the media server during the live event, a composited video stream by applying the respective portion of augmented reality content specified by a current cue of the sequence of cues to the first live video;

causing, based on the timeline data, an output device positioned at the venue to display the composited video stream concurrently with the live event; and contemporaneously providing, over a network from the media server to each of a plurality of client devices located at the venue, an indication of the current cue, each of the plurality of client devices comprising a respective second camera configured to capture respective second live video in association with the live event, and each of the plurality of client devices being configured to render, locally at the client device and based on the indication of the current cue, the respective portion of augmented reality content specified by the current cue onto the respective second live video concurrently with the live event.

18. The non-transitory computer-readable storage medium of claim 17, wherein the indication of the current cue comprises a cue ID for synchronizing the augmented reality content with the first live video for display on the output device, and for synchronizing the augmented reality content with the respective second live video for display on the plurality of client devices.

* * * * *